Nov. 1, 1927.

L. R. BRIGGS

EYEGLASSES

Filed Jan. 12, 1925

Inventor
Luther R. Briggs

By

Attorney

Nov. 1, 1927.  
L. R. BRIGGS  
1,647,124  
EYEGLASSES  
Filed Jan. 12, 1925  
2 Sheets-Sheet 2
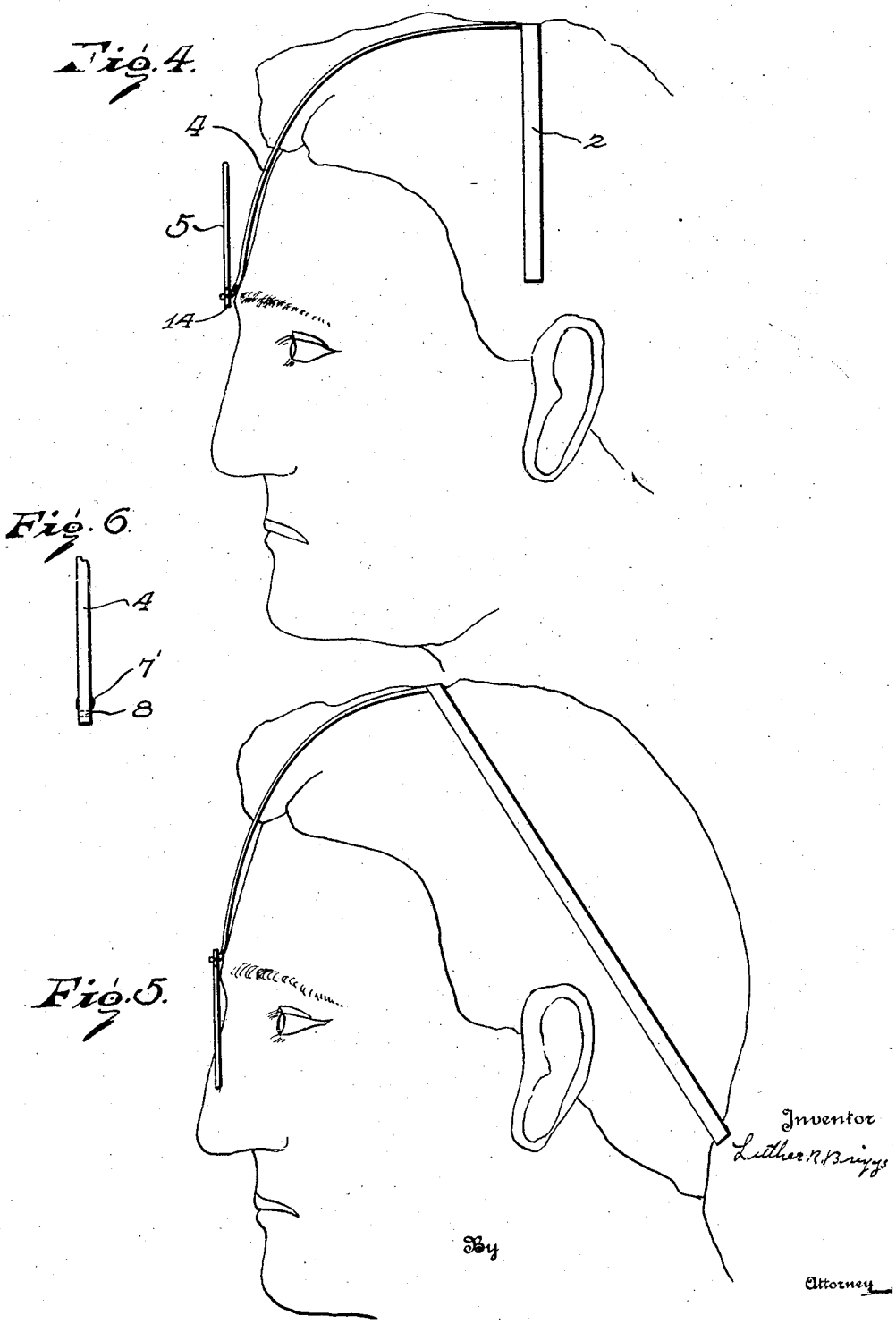

Patented Nov. 1, 1927.

1,647,124

UNITED STATES PATENT OFFICE.

LUTHER R. BRIGGS, OF HERSMAN, ILLINOIS.

EYEGLASSES.

Application filed January 12, 1925. Serial No. 1,920.

This invention relates to eye glasses.

It is an object of this invention to provide an eye glass which may be adjusted, and which may be moved out of the way when not in use, without moving the head embracing piece.

A further object of this invention is to provide an eye glass support which is comfortable, and which holds the eye glass rigidly in the desired position without discomforting the wearer.

A further object of this invention is to provide an eye glass without side pieces interfering with the comfort and vision.

With the foregoing and other objects in view I have invented the device shown in the accompanying drawings, in which:

Figure 4 is a like view to Figure 3, with the eye-glasses away from the eyes.

Figure 5 is a similar view to Figure 3, with the head embracing band in a different position.

Figure 6 is a detail of the connection between the glass rim and its carrying arm.

Figure 1:
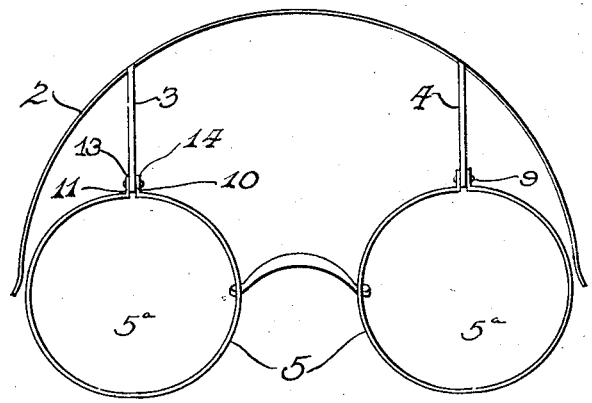
Figure 1 is a front elevation of my improved device with the glasses before the eye.
Figure 2:
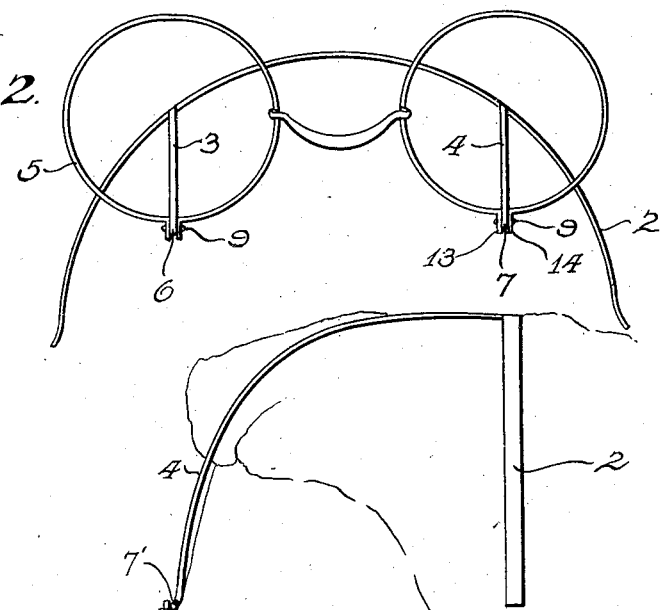
Figure 2 is a like view to Figure 1, with the glasses away from the eye.
Figure 3:
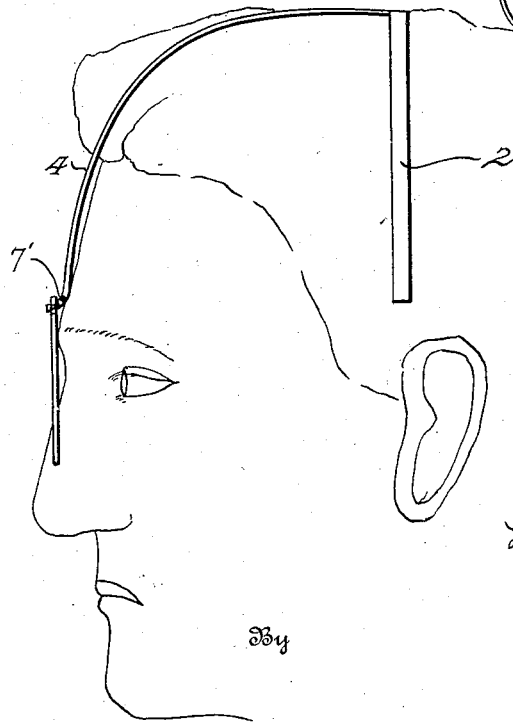
Figure 3 is a fragmentary portion of a head provided with the device.

Like reference characters indicate like parts throughout the several views of the drawings and in the specification, in which 2 is a resilient embracing band adapted preferably to fit itself over the top of the forehead and extend over the top, of the ear, but which may be fitted at any desired portion of the head and which may be of wire either round or flat, or any other desired shape, and which is in the nature of the usual head embracing bands carried by the usual form of eye glasses, except that it is in one continued piece and is interconnected with the glasses as hereinafter described. Depending forwardly from the band 2 is a pair of supports 3 and 4 carrying eye glass rims 5, within which eye glass rims 5 are mounted glasses 5ª. The rims 5 are pivoted to the supports 3 and 4 at 6 and 7, at substantially medial of the top, of the rims, the pivoting being accomplished by holes 8 in the supports 3 and 4, carrying rivets 9 passing through lugs 10 and 11 on the rims 5. The supports 3 carry raised portions or stops 7' which may be in the nature of headed rivets and which cooperate with the outstanding yielding ends 13 and 14 of the lugs 10 and 11, so that when the glasses are in the lower-most or used position, the yielding of the ends 13 and 14 will frictionally prevent their being jarred from this position. When however the rims are turned upon their pivotal axis, the ends 13 and 14 pass over the raised portion 7', and are prevented from being jarred from this upstanding position in the same manner as they are prevented from being jarred from the lowermost position. By lengthening the support members 3 and 4, it is obvious that the band 2 may be raised or lowered to any desired position to suit the pleasure of the wearer.

Claims:

1. In an eye glass device of the kind described and in combination, a head piece band constructed of resilient material formed to fit the head whereby the same is removably retained in operative position by its engagement therewith, a pair of forwardly projecting spaced supporting members carried by said band and shaped to conform to the fore part of the head, an eye glass retaining rim carried by each member at its forward end, and a connecting nose piece band extending between and rigidly connecting the rim.

2. In an eye glass device of the kind described and in combination, a head piece band constructed of resilient material formed to fit the head whereby the same is removably retained in operative position by its engagement therewith, a pair of forwardly projecting spaced supporting members carried by said band and shaped to conform to the fore part of the head, an eye glass retaining rim pivoted to each member at its forward end, and a connecting nose piece band extending between and rigidly connecting the rims at points below their pivotal connection with said supporting members.

3. In an eye glass device of the kind described and in combination, a head piece band constructed of resilient material formed to fit the head whereby the same is removably retained in operative position by its engagement therewith, a pair of forwardly projecting spaced supporting members carried by said band and shaped to conform to the fore part of the head, an eye glass retaining rim pivotally carried at a point medial of the top by each member at its forward end, and a connecting nose piece band extending between and rigidly connecting the rims at points substantially midway between the top and bottom of the ends.

4. In an eye glass device of the kind described and in combination, a head piece band constructed of resilient material formed to fit the head whereby the same is removably retained in operative position by its engagement therewith, a pair of forwardly projecting spaced supporting members carried by said band and shaped to conform to the fore part of the head, an eye glass retaining rim pivotally carried by each member at its forward end, and a connecting nose piece band extending between and connecting the rims.

5. In an eye glass device of the kind described and in combination, a head piece band constructed of resilient material formed to fit the head whereby the same is removably retained in operative position by its engagement therewith, a pair of forwardly projecting spaced supporting members carried by said band and shaped to conform to the fore part of the head and terminating at points substantially above the centers of the eyes, an eye glass retaining rim pivotally carried by each member at its forward end, and a connecting nose piece band extending between and connecting the rims.

6. In an eye glass device of the kind described and in combination, a head piece band constructed of resilient material formed to fit the head whereby the same is removably retained in operative position by its engagement therewith, a pair of forwardly projecting spaced supporting members carried by said band and shaped to conform to the fore part of the head, an eye glass retaining rim pivotally carried by each member at its forward end, stops for normally preventing accidental movement of the rims from either of its extreme adjusted positions, and a connecting nose piece band extending between and connecting the rims.

In testimony whereof, I have hereunto signed my name.

LUTHER R. BRIGGS.